United States Patent
Senneff et al.

(10) Patent No.: US 8,635,011 B2
(45) Date of Patent: Jan. 21, 2014

(54) SYSTEM AND METHOD FOR CONTROLLING A VEHICLE IN RESPONSE TO A PARTICULAR BOUNDARY

(75) Inventors: Aaron Matthew Senneff, Ankeny, IA (US); Timothy J. Roszhart, Urbandale, IA (US)

(73) Assignee: Deere & Company, Moline, IL (US)

( * ) Notice: Subject to any disclaimer, the term of this patent is extended or adjusted under 35 U.S.C. 154(b) by 1182 days.

(21) Appl. No.: 11/831,831

(22) Filed: Jul. 31, 2007

(65) Prior Publication Data

US 2009/0037096 A1 Feb. 5, 2009

(51) Int. Cl.
*A01B 69/00* (2006.01)

(52) U.S. Cl.
USPC ........... 701/207; 701/408; 701/431; 701/435; 701/442; 701/466; 340/995.1; 340/995.19; 340/436; 340/438; 172/5; 172/233; 56/10.2 R; 56/10.2 A; 56/10.2 F

(58) Field of Classification Search
USPC ....................................................... 701/205
See application file for complete search history.

(56) References Cited

U.S. PATENT DOCUMENTS

| | | |
|---|---|---|
| 3,468,379 A | 9/1969 | Rushing et al. |
| 3,606,933 A | 9/1971 | Rushing et al. |
| 4,515,221 A | 5/1985 | van der Lely |
| 4,518,044 A | 5/1985 | Wiegardt et al. |
| 4,626,993 A | 12/1986 | Okuyama et al. |
| 5,543,802 A | 8/1996 | Villevieille et al. |
| 5,558,163 A | 9/1996 | Hollstein |
| 5,606,850 A | 3/1997 | Nakamura |
| 5,704,546 A * | 1/1998 | Henderson et al. ............... 239/1 |
| 5,899,950 A | 5/1999 | Milender et al. |
| 5,961,573 A * | 10/1999 | Hale et al. ......................... 701/50 |
| 5,978,723 A * | 11/1999 | Hale et al. ......................... 701/50 |
| 5,991,694 A * | 11/1999 | Gudat et al. ....................... 702/2 |
| 6,085,134 A | 7/2000 | Adam |
| 6,119,069 A * | 9/2000 | McCauley ......................... 702/5 |
| 6,128,574 A | 10/2000 | Diekhans |
| 6,141,614 A * | 10/2000 | Janzen et al. .................... 701/50 |
| 6,236,924 B1 * | 5/2001 | Motz et al. ....................... 701/50 |

(Continued)

FOREIGN PATENT DOCUMENTS

| | | |
|---|---|---|
| DE | 19921105 | 1/2000 |
| DE | 102005008105 | 8/2006 |
| FR | 2800232 | 5/2001 |
| WO | 98/46065 | 10/1998 |

OTHER PUBLICATIONS

Science fiction becomes farming fact. Profi Electronics. Precision Farming Event 2007, pp. 36-38, profi May 2007. Website: www.profi.co.uk.

(Continued)

*Primary Examiner* — Jonathan M. Dager

(57) ABSTRACT

A system and method for controlling a vehicle in response to the presence of one or more vehicle boundary. According to various embodiments, a system is provided that automates end-turns and sequence execution in real-time based on approaching boundaries. In various embodiments, no pre-planning is required once boundaries and a turn pattern have been defined. Once these items are defined, the system creates end-turns based on what type of boundary is approaching and the turn path prescribed. The system determines what vehicle functions to execute based on pre-recorded sequences and executes the turns and the sequences automatically based on the location and speed of the vehicle and its relationship to various boundaries.

20 Claims, 4 Drawing Sheets

(56) References Cited

U.S. PATENT DOCUMENTS

| | | | |
|---|---|---|---|
| 6,266,595 B1* | 7/2001 | Greatline et al. | 701/50 |
| 6,336,051 B1* | 1/2002 | Pangels et al. | 700/50 |
| 6,345,231 B2 | 2/2002 | Quincke | |
| 6,463,374 B1* | 10/2002 | Keller et al. | 701/50 |
| 6,681,551 B1 | 1/2004 | Sheidler et al. | |
| 6,907,336 B2* | 6/2005 | Gray et al. | 701/50 |
| 6,934,615 B2 | 8/2005 | Flann et al. | |
| 6,990,399 B2 | 1/2006 | Hrazdera et al. | |
| 7,010,425 B2 | 3/2006 | Gray et al. | |
| 7,079,943 B2 | 7/2006 | Flann et al. | |
| 7,110,881 B2 | 9/2006 | Gray et al. | |
| 7,162,348 B2 | 1/2007 | McClure et al. | |
| 7,216,033 B2 | 5/2007 | Flann et al. | |
| 7,228,214 B2 | 6/2007 | Flann et al. | |
| 7,451,030 B2* | 11/2008 | Eglington et al. | 701/50 |
| 7,502,678 B2* | 3/2009 | Diekhans et al. | 701/50 |
| 7,739,015 B2* | 6/2010 | Senneff et al. | 701/50 |
| 8,209,075 B2* | 6/2012 | Senneff et al. | 701/23 |
| 2003/0187560 A1* | 10/2003 | Keller et al. | 701/50 |
| 2003/0208319 A1* | 11/2003 | Ell et al. | 702/5 |
| 2004/0158355 A1* | 8/2004 | Holmqvist et al. | 700/245 |
| 2004/0193348 A1* | 9/2004 | Gray et al. | 701/50 |
| 2004/0193349 A1* | 9/2004 | Flann et al. | 701/50 |
| 2004/0217869 A1* | 11/2004 | Bouchard et al. | 340/573.4 |
| 2005/0075785 A1* | 4/2005 | Gray et al. | 701/202 |
| 2005/0273253 A1* | 12/2005 | Diekhans et al. | 701/202 |
| 2006/0025894 A1* | 2/2006 | O'Connor et al. | 701/1 |
| 2006/0064222 A1* | 3/2006 | Palmer | 701/50 |
| 2006/0142913 A1 | 6/2006 | Coffee et al. | |
| 2006/0200294 A1* | 9/2006 | Scheufler et al. | 701/50 |
| 2006/0237200 A1* | 10/2006 | Unruh et al. | 172/2 |
| 2007/0186530 A1* | 8/2007 | Meier et al. | 56/14.6 |

OTHER PUBLICATIONS

Harringa, Emily. Farming The Easy Way. Professional Surveyor Magazine. Mar. 2007.

* cited by examiner

SYSTEM AND METHOD FOR CONTROLLING A VEHICLE IN RESPONSE TO A PARTICULAR BOUNDARY

FIELD OF THE INVENTION

The present invention relates generally to the field of agricultural equipment. More particularly, the present invention relates to the use of agricultural equipment in planting, harvesting and other operations.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Conventional agricultural combines include a header leading the combine, having a forward gathering portion and a feederhouse portion which contains elements for processing crop material and/or transferring the crop material from the gathering portion to the body of the combine. In the body of the combine, the grain is separated from the chaff and straw, collected, and thereafter unloaded via an auger. Such combines have a variety of designs.

Various systems have been developed that serve to automate various vehicle functions, with such functions including vehicle speed, implement adjustments, vehicle turns, etc. These systems typically involve a user or operator setting these functions outside of the vehicle. In many cases, once a set of functions is defined, they cannot be changed or adjusted on the fly. Such systems are not capable of adapting to objects or boundaries that the vehicle may approach during use. Additionally, such systems often execute individual sequences based upon the vehicle's distance or an implement's distance from an end-turn, without taking into account boundary lines or other obstacles. Lastly, such systems often require the use of a separate personal computer or device in the cab of the vehicle, meaning that expensive, space-consuming equipment must be stored in the cab even if the equipment only performs a single task.

SUMMARY OF THE INVENTION

Various embodiments of the present invention provide a system and method for controlling a vehicle in response to the presence of one or more vehicle boundary. According to various embodiments, a system is provided that automates end-turns and sequence execution in real-time based on approaching boundaries. In various embodiments, no pre-planning is required once boundaries and a turn pattern have been defined. Once these items are defined, the system creates end-turns based on what type of boundary is approaching and the turn path prescribed. The system determines what vehicle functions to execute based on pre-recorded sequences and executes the turns and the sequences automatically based on the location and speed of the vehicle and its relationship to various boundaries.

These and other features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
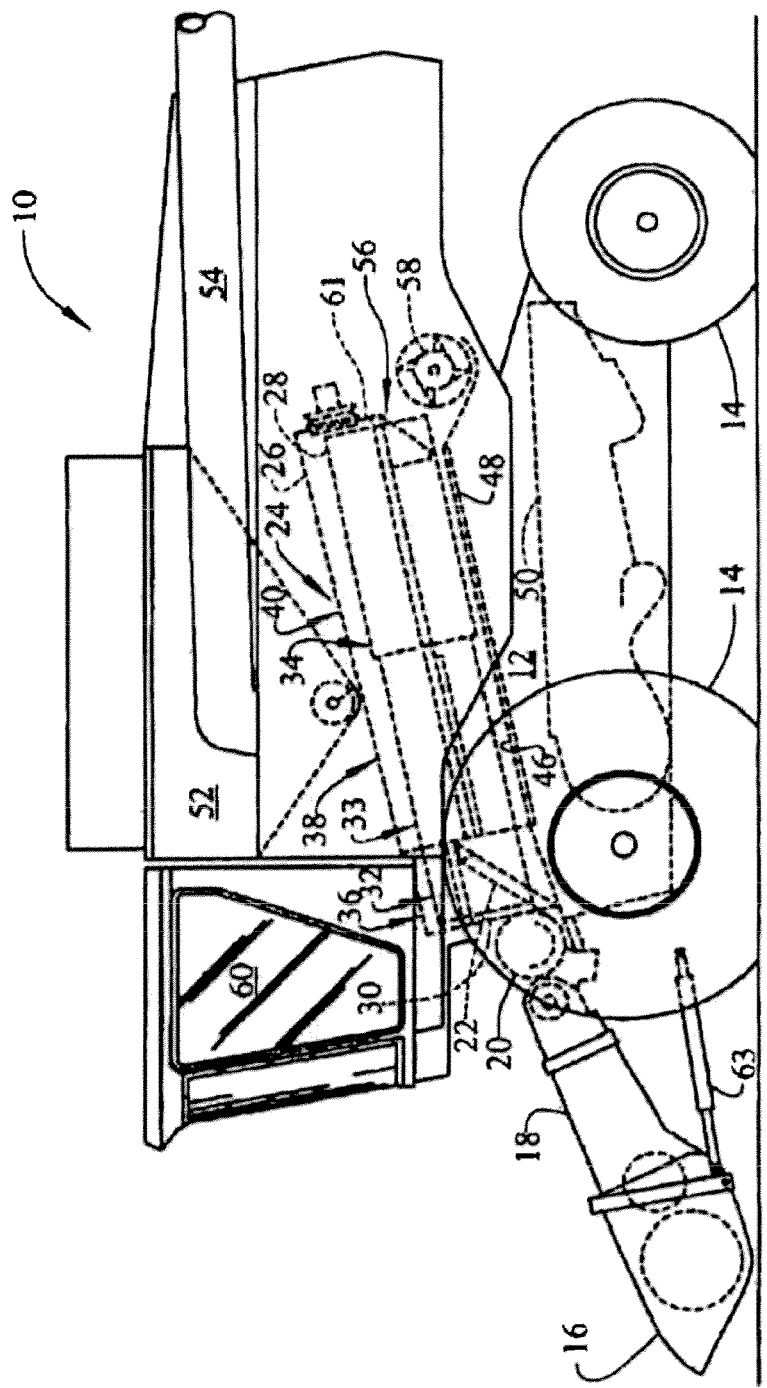
FIG. 1 is a side view of an exemplary agricultural combine which is capable of incorporating a control system in accordance with various embodiments of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an example agricultural combine 10 of the type incorporating an axial rotary crop-processing unit. The combine 10 comprises a supporting structure or chassis 12 mounting a ground engaging mechanism 14 shown in the form of tires. Alternatively, tracks can be used in place of tires. A harvesting platform 16 is used for harvesting a crop and directing the crop to a feederhouse 18. The harvested crop is directed by the feederhouse 18 to a beater 20. The beater directs the crop upwardly to a rotary crop-processing unit 24. The rotary crop-processing unit is located between the side sheets of the combine. The side sheets form part of the supporting structure 12.

The rotary crop-processing unit 24 comprises a rotor housing 26 and a rotor 28 located within the housing. The harvested crop enters the housing through an inlet 22 at the inlet end 30 of the housing 26. The rotor is provided with an inlet feed portion 32, a threshing portion 33, and a separating portion 34. The rotor housing has a corresponding infeed section 36, a threshing section 38, and a separating section 40.

Both the threshing portion 33 and the separating portion 34 of the rotor are provided with crop engaging members (not shown). The threshing section 38 of the housing is provided with a concave 46 while the separating section 40 of the housing is provided with a grate 48. Grain and chaff released from the crop mat fall through the concave 46 and grate 48. The concave and the grate prevent the passage of crop material larger than grain or chaff from entering the combine cleaning system 50 below the rotary crop-processing unit 24.

Grain and chaff falling through the concave and grate is directed to the cleaning system 50 that removes the chaff from the grain. The clean grain is then directed by an elevator (not shown) to clean the grain tank 52 where it can be directed to a truck or grain cart by unloading the auger 54. Straw that reaches the end 61 of the housing is expelled through an outlet 56 to a beater 58. The beater propels the straw out the rear of the combine. The end 61 is thus the outlet end of the housing. The crop material moves through the rotary crop-processing unit in a crop flow direction from the inlet end 30 to the outlet end 61 of the housing. The operation of the combine is controlled from the operator cab 60.

The header 16 can be lifted by use of lift cylinders 63. The auger 54 can be pivoted via a cylinder or motor (not shown) about a vertical axis between an inboard orientation shown and an outboard orientation, substantially perpendicular to the traveling direction of the combine, to offload grain to a body of a truck. The auger can be pivoted inboard, substantially parallel to the direction of travel of the combine when not in use.

In addition to the vehicle depicted in FIG. 1, it should be noted that the various embodiments of the present invention may be used with a tractor that pulls an implement via a hitch, with the implement being typically powered by a tractor's power take-off shaft (PTO) that is coupled to the implement. For example, various embodiments may operate in conjunction with a tractor that can raise or lower a hitch, retract a hitch, and change the speed, direction, or the on/off status of the PTO. The implement may comprise, for example, a planter, a cultivator, a pull-behind mower, a planter or seeding apparatus, a scraper (for leveling land or making roads, or irrigation or drainage channels), a digger or trencher (e.g., for laying drain tile), or other agricultural or construction equipment.

Various embodiments of the present invention provide a system and method by which end-turns and the execution of sequences can be automated in real-time based on approaching Boundaries. In other words, no pre-planning is necessary once boundaries and a turn pattern have been defined, with both being definable in the vehicle and in the field). Once these items are defined, the system create end-turns based on what type of boundary is approaching and the turn path that has been prescribed. The system simultaneously determines which vehicle functions to execute based on pre-recorded sequences that can be defined from the cab and executes the turn and the sequence automatically based on the location (which can be determined, for example, via GPS) and speed of the vehicle and its relationship to boundaries. This system is capable of reacting to approaching boundaries "on the fly," and the operator can make necessary changes from the cab if necessary in order to avoid any obstacles. Additionally, as a single GPS and display system may be used to perform the necessary activities associated with the various embodiments of the present invention, can clutter can also be reduced.

In various embodiments, the system uses a set of four sequences that are executed separately based on the type of boundary being crossed. These sequences are (1) Enter Headlands (the area at the end of a planted field where machinery is turned); (2) Exit Headlands; (3) Enter Passable Interior Boundaries; and (4) Exit Passable Interior Boundaries. Each of these sequences can be unique and drive the system to perform different actions. For example, entering a passable interior such as a waterway, the "Enter Passable Interior Boundary" sequence can have the machine slow down and only partially raise the implement. In contrast, when entering a headland, the "Enter Headlands" sequence can have the machine turn the differential lock to OFF, slow down, and then raise the implement completely out of the ground before completing a turn.

A special situation can exist when the vehicle approaches an impassable boundary. For example, an external boundary of a field or some form of internal boundary (such as a pond) may simply not be passable by the machine. In such a case, the can system realizes that an impassable area is ahead, and in turn notify the operator to be alert and take control if necessary. Audible and/or visual tones may be used to ensure that the alert is acknowledged.

Figure 2:
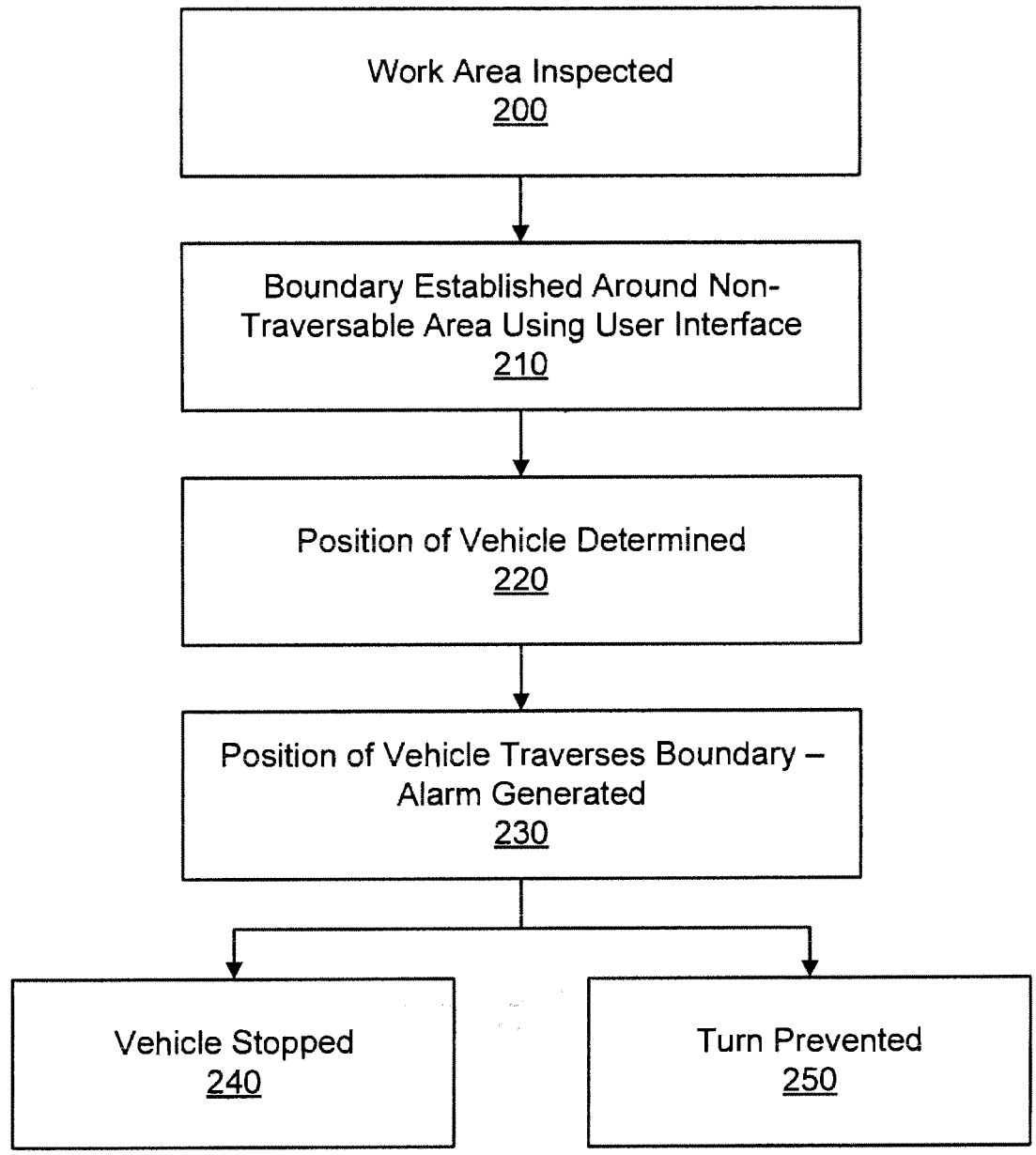
FIG. 2 is a flow chart showing how various embodiments of the present invention may be implemented.

FIG. 2 is a flow chart showing how various embodiments of the present invention may be implemented. At 200 in FIG. 2, a work area is inspected prior to operating a vehicle in the work area. This inspection serves to identify non-traversable areas which cannot be safely or expediently traversed by the vehicle. At 210, a boundary is established around the non-traversable area within the work area based on the inspection. This boundary may be established via a user interface of the vehicle. At 220, a position of the vehicle is determined via a location-determining receiver such as a GPS system. At 230, a warning alarm is generated for an operator if the determined position of the vehicle traverses the boundary.

When the boundary is traversed, a number of other actions may also occur. For example, the vehicle may be stopped completely at 240 if the determined position traverses the boundary, particularly if the boundary is impassible by the vehicle. The non-traversable area may contain an obstacle and may comprise, but is not limited to, a hedge, vegetation, tree growth, bushes, bramble, a wooded area, a tree, a bush, a mud slide, a rock slide, a stream, a brook, a pond, a lake, a river, flood water, and a swamp. In the event that the vehicle is performing a turn when the boundary is traversed, or is about to perform a turn when a boundary is traversed, the vehicle can also be prevented from executing the turn if the vehicle, and this is represented at 250. Such a turn may be associated, for example, with a headland region between an outer border of the work area and an interior border of the work area. The boundary may also lie within an interior of the work area or a headland of the work area.

In addition to the above, the system according to various embodiments may utilize "Minimize Skip" versus "Minimize Overlap" settings. These settings may be determined by the operator and can be used to make sure one or more implements are raised ahead of an approaching boundary or only after completely traversing through the boundary.

Figure 3:
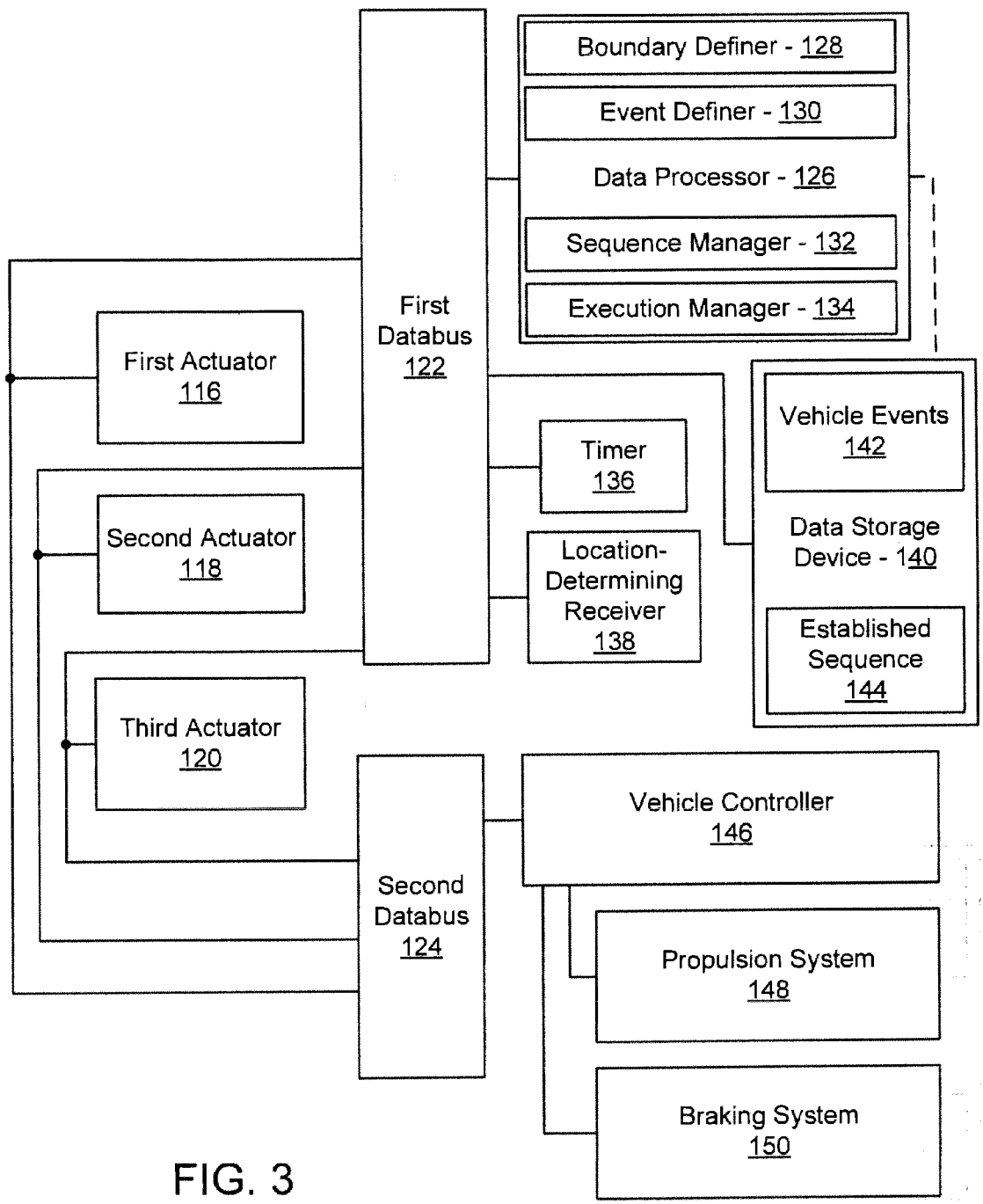
FIG. 3 is a schematic diagram of a system by which a sequence of vehicle events can be controlled according to a first embodiment of the present invention.
Figure 4:
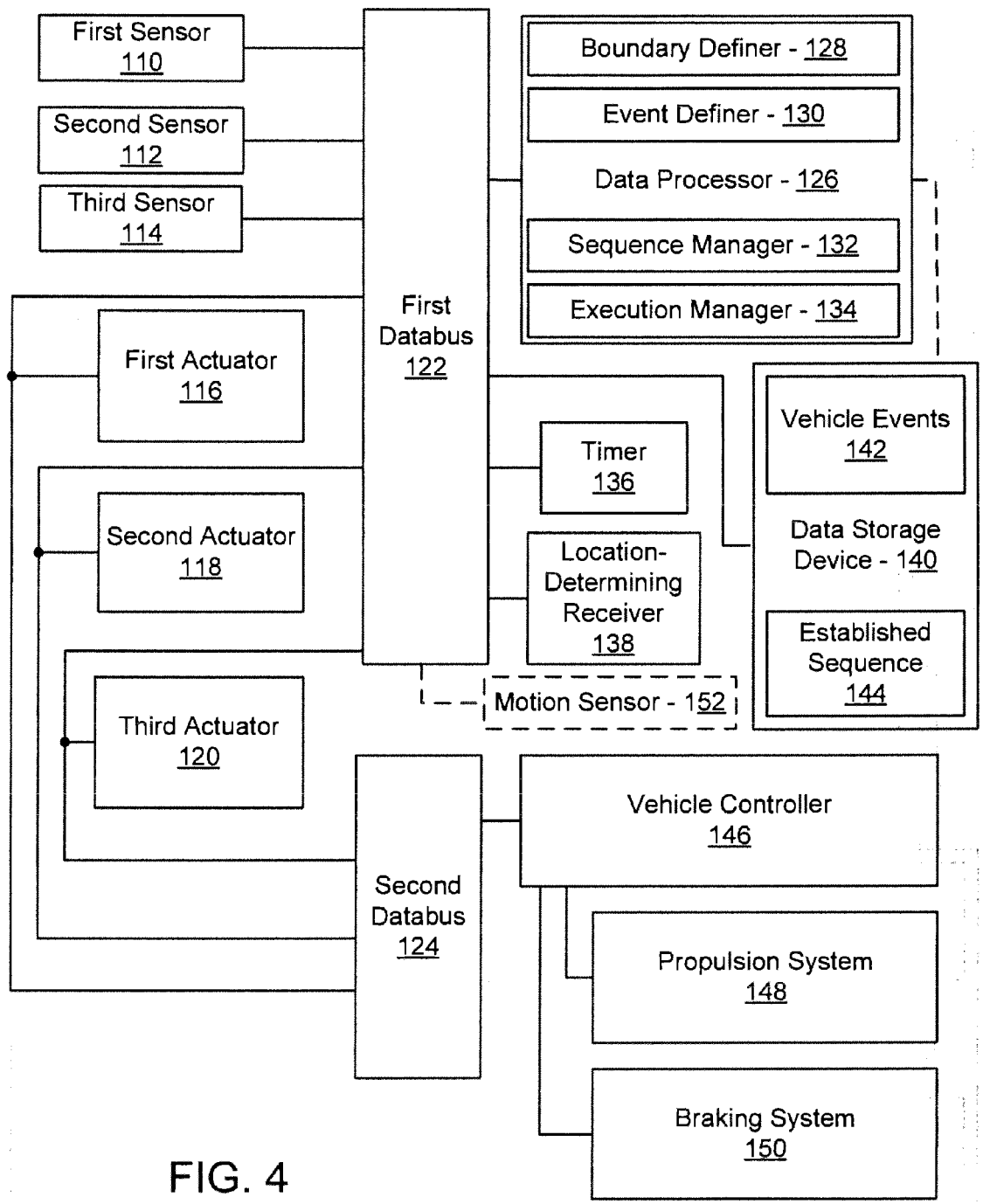
FIG. 4 is a schematic diagram of a system by which a sequence of vehicle events can be controlled according to a second embodiment of the present invention.

FIGS. 3 and 4 are schematic diagrams of systems by which a sequence of vehicle events can be controlled according to different embodiments of the present invention. In both FIGS. 3 and 4, a data storage device 140 such as a computer memory can save information such as vehicle events 142 and established sequences 144. The data storage unit 140 is communicatively connected to a data processor 126. The data processor 126 can implement various programs, routines, subroutines etc. For example, the data processor can implement a boundary definer 128, an event definer 130, a sequence manager 132 (which may include a sequence definer, sequence editor, etc.), and an execution manager 134, with the execution manager performing functions such as adjusting speeds and compensating for changes in function.

In the systems of FIGS. 3 and 4, the data processor 126 is communicatively connected to a first databus 122. Other items which may be connected in some form to the first databus 122 include a timer 136 and a location-determining receiver 138. The location-determining receiver may comprise, for example, a Global Positioning System (GPS) receiver. In the system of FIG. 3, a motion sensor 152 may also be communicatively connected to the first databus 122. The motion sensor 152 may comprise, for example, a velocity sensor and/or an accelerometer. A first sensor 110, a second sensor 112 and a third sensor 114 may also be operatively connected to the first databus 122, with these sensors comprising, for example, implement height sensors, hitch position sensors, power take-off shaft sensors, RPM sensors, etc.

The first databus 122 can transfer data from any of these components to one of a plurality of actuators. In FIGS. 2 and 3, a first actuator 116, a second actuator 118 and a third actuator are shown. These actuators may comprise, for example, implement actuators, hitch actuators, power take-off actuators, etc. Each of the first, second and third actuators 116, 118 and 120 may in turn be communicatively connected to a second databus 124, which transfer data to a vehicle controller 146 and ultimately the vehicle's propulsion system 148, braking system 150, and other systems of the vehicle that are known in the art.

The various embodiments of the present invention described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A method for controlling a vehicle, comprising:
    inspecting a work area prior to operation of the vehicle in the work area to identify at a non-traversable area that the vehicle cannot traverse safely or expediently;
    establishing, via a user interface, a boundary around the non-traversable area within the work area based on the inspection;
    establishing a passable interior boundary around a traversable area within the work area;
    determining a position of the vehicle via a location-determining receiver;
    generating a warning alarm to an operator if the determined position of the vehicle traverses the boundary around the non-traversable area; and
    slowing the vehicle down and controlling an implement to be at least partially raised if the determined position of the vehicle traverses the passable interior boundary.

2. The method of claim 1, further comprising stopping the vehicle if the determined position of the vehicle traverses the boundary around the non-traversable area.

3. The method of claim 1, wherein the non-traversable area contains an obstacle.

4. The method of claim 1, wherein the non-traversable area is selected from the group consisting of a hedge, vegetation, tree growth, bushes, bramble, a wooded area, a tree, a bush, a mud slide, a rock slide, a stream, a brook, a pond, a lake, a river, flood water, and a swamp.

5. The method of claim 1, wherein the boundary around the non-traversable area lies within one of an interior of the work area and a headland of the work area.

6. The method of claim 1, further comprising preventing the vehicle from executing a turn if the vehicle traverses the boundary around the non-traversable area during the turn or would traverse the boundary around the non-traversable area during the turn.

7. The method of claim 6, wherein the turn is associated with a headland region between an outer border of the work area and an interior border of the work area.

8. A system for controlling a vehicle, comprising:
    a display interface configured to define a boundary around a non-traversable area within a work area based upon a prior inspection, and establish a passable interior boundary around a traversable area within the work area; and
    a location-determining receiver configured to determine a position of the vehicle, wherein
    a warning alarm is generated for an operator if the determined position of the vehicle traverses the boundary around the non-traversable area, and
    the vehicle is slowed down and an implement is controlled to be at least partially raised if the determined position of the vehicle traverses the passable interior boundary.

9. The system of claim 8, wherein the non-traversable area is selected from the group consisting of a hedge, vegetation, tree growth, bushes, bramble, a wooded area, a tree, a bush, a mud slide, a rock slide, a stream, a brook, a pond, a lake, a river, flood water, and a swamp.

10. The system of claim 8, wherein the boundary around the non-traversable area lies within one of an interior of the work area and a headland of the work area.

11. The system of claim 8, wherein the system is configured to stop the vehicle if the determined position of the vehicle traverses the boundary around the non-traversable area.

12. The system of claim 8, wherein the system is configured to prevent the vehicle from executing a turn if the vehicle traverses the boundary around the non-traversable area during the turn or would traverse the boundary around the non-traversable area during the turn.

13. The system of claim 12, wherein the turn is associated with a headland region between an outer border of the work area and an interior border of the work area.

14. A vehicle, comprising:
    a display interface configured to define a boundary around a non-traversable area within a work area based upon a prior inspection, and establish a passable interior boundary around a traversable area within the work area; and
    a location-determining receiver configured to determine a position of the vehicle, wherein
    a warning alarm is generated for an operator if the determined position of the vehicle traverses the boundary around the non-traversable area, and
    the vehicle is slowed down and an implement is controlled to be at least partially raised if the determined position of the vehicle traverses the passable interior boundary.

15. The vehicle of claim 14, wherein the non-traversable area is selected from the group consisting of a hedge, vegetation, tree growth, bushes, bramble, a wooded area, a tree, a bush, a mud slide, a rock slide, a stream, a brook, a pond, a lake, a river, flood water, and a swamp.

16. The vehicle of claim 14, wherein the boundary around the non-traversable area lies within one of an interior of the work area and a headland of the work area.

17. The vehicle of claim 14, wherein the vehicle is stopped if the determined position of the vehicle traverses the boundary around the non-traversable area.

18. The vehicle of claim 14, wherein the vehicle is prevented from executing a turn if the vehicle traverses the boundary around the non-traversable area during the turn or would traverse the boundary around the non-traversable area during the turn.

19. The vehicle of claim 18, wherein the turn is associated with a headland region between an outer border of the work area and an interior border of the work area.

20. The vehicle of claim 14, wherein the non-traversable area contains an obstacle.

* * * * *